United States Patent [19]

Smith et al.

[11] 4,064,358

[45] Dec. 20, 1977

[54] TERMINATION FOR CONNECTING A SUBMARINE COAXIAL CABLE TO A SUBMERGIBLE HOUSING

[75] Inventors: Colin F. G. Smith; Ronald C. Oldham, both of Chandlers Ford; Michael J. Hedges, Hythe, Southampton; Alan J. New, Southampton; William Pearson, Chandlers Ford, all of England

[73] Assignee: International Standard Electric Corporation, New York, N.Y.

[21] Appl. No.: 686,041

[22] Filed: May 13, 1976

[30] Foreign Application Priority Data

July 22, 1975 United Kingdom ............... 30593/75

[51] Int. Cl.² .......................................... H02G 15/14
[52] U.S. Cl. .................................................. 174/70 S
[58] Field of Search ........................ 174/70 S; 29/628

[56] References Cited

FOREIGN PATENT DOCUMENTS

| 787,702 | 12/1957 | United Kingdom | 174/70 S |
| 806,521 | 12/1958 | United Kingdom | 174/70 S |
| 1,280,439 | 7/1972 | United Kingdom | 174/70 S |

*Primary Examiner*—Laramie E. Askin
*Attorney, Agent, or Firm*—Thomas L. Peterson

[57] ABSTRACT

A termination between a submarine coaxial cable and a submerged repeater housing. It employs an anchor assembly for transferring the load in the cable core to the repeater housing, and a protective boot assembly for surrounding and supporting the cable where it extends away from the anchor assembly. The boot assembly is rigidly connectible to the housing. Movement of the cable within the boot tube is permitted to a greater extent near the free end of the boot assembly than near the housing, by means of a flexible tube and bellmouth assembly, in order to cater for the stresses associated with the cable handling and recovery.

2 Claims, 3 Drawing Figures

TERMINATION FOR CONNECTING A SUBMARINE COAXIAL CABLE TO A SUBMERGIBLE HOUSING

BACKGROUND OF THE INVENTION

This invention relates to a termination between a submarine coaxial cable and a submergible repeater housing.

A termination is required to perform two basic functions. It must have sufficient tensile strength to withstand the strain of the underwater catenary when laying or recovering the repeatered cable in deep ocean waters, in addition to dynamic loads likely to be encountered in rough seas and bad weather. It must also provide for cable bending as the rigid repeater travels over the sheaves and leaving the cable temporarily without any radial support. A cable termination using a gimbal arrangement is effective in these two respects, but is expensive to manufacture.

SUMMARY OF THE INVENTION

According to one aspect of the present invention there is provided a termination for connecting a submarine coaxial cable to a submergible repeater housing. The termination includes an anchor assembly for rigidly clamping a central strength member of the cable to the housing, and a boot assembly for surrounding and supporting the cable where it extends away from the anchor assembly. The boot assembly is rigidly connectible to the housing and is such as to allow the cable to flex to a greater extent within its free end than near its end connectible to the housing.

According to another aspect of the present invention there is provided a method of terminating a submarine coaxial cable into a submergible repeater housing including the steps of rigidly clamping the central strength member of the submarine cable to the repeater housing via an anchor assembly, connecting the inner conductor of the submarine cable to the inner conductor of a repeater tail cable via the anchor assembly, connecting the outer conductor of the submarine cable to the outer conductor of the repeater tail cable via a composite water barrier assembly positioned on the dielectric of the submarine cable and via the anchor assembly, and rigidly fixing a protective boot assembly to a housing of the anchor assembly. The boot assembly extends away from the anchor assembly housing over a portion of the cable, including that on which the water barrier assembly is arranged, and is such as to allow the cable to flex to a greater extent within its free end than near its end connected to the anchor assembly housing.

DESCRIPTION OF THE PREFERRED EMBODIMENTS

Figure 1:
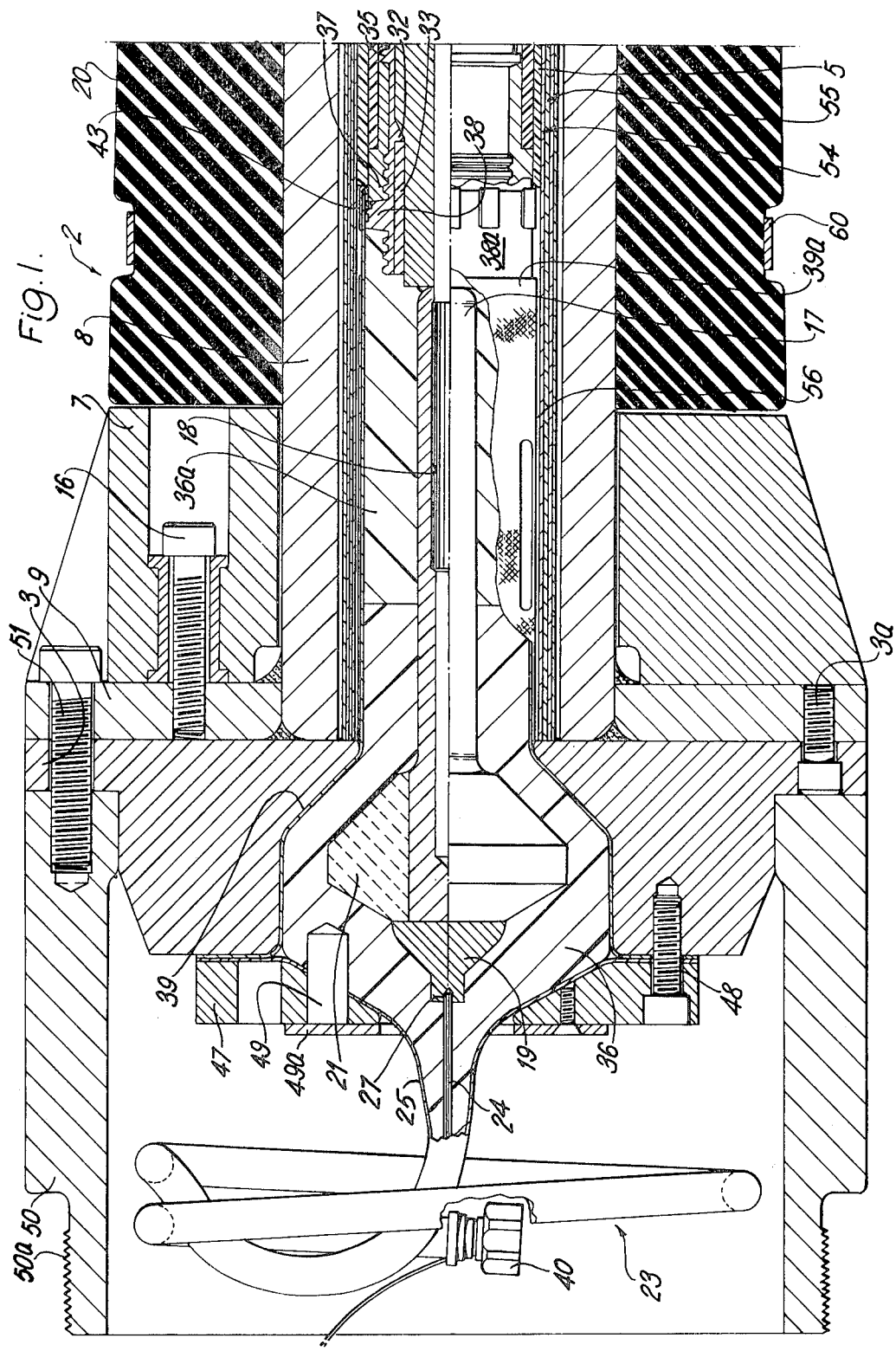
FIG. 1 is a partial longitudinal section of the left end portion of the termination of the invention shown connected to a repeater housing.
Figure 2:
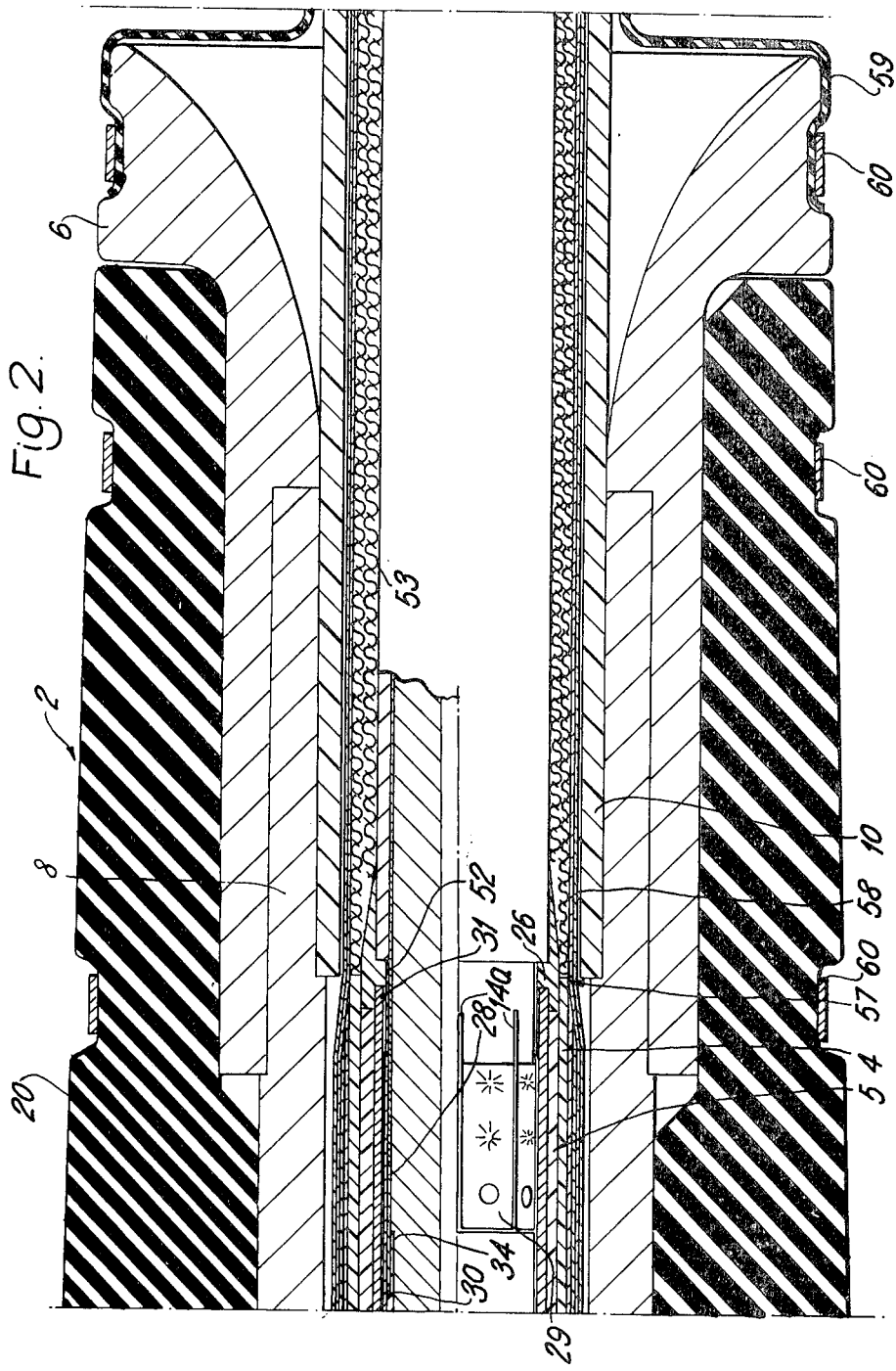
FIG. 2 is a partial longitudinal section of an intermediate portion of the termination.
Figure 3:
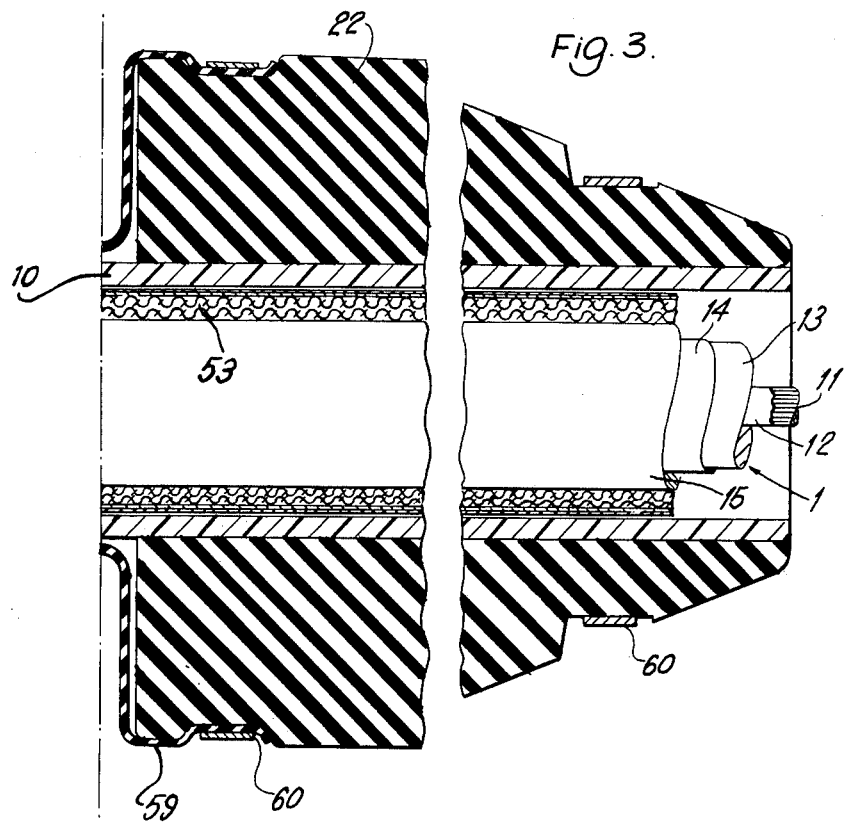
FIG. 3 is a partial longitudinal section of the right end of the termination.

For the purpose of the following description a submarine coaxial cable is assumed to consist of a stranded steel rope (central strength member) 11, an inner conductor 12, dielectric 13, an outer conductor 14, in the form of a longitudinally seamed tube, and an outer sheath 15. The inner conductor 12 may be of copper, the dielectric 13 polyethylene, the outer conductor 14 aluminum and the outer sheath 15 polyethylene.

The first step in the manufacture of the termination shown in the drawing is the slipping over the free end of the submarine cable 1 a boot assembly 2, a heat-shrinkable tube 5, an anchor housing 3, an outer conductor or braid spinning 39 with a windowed braid 39a, and a plastic oversheath tube 4. The boot assembly 2 comprises a boot tube 8 of, for example, mild steel, having a flange portion 9 of, for example, mild steel welded to it. A zinc anode 7 provided for conventional anodic protection purposes is attached to the flange portion by means of screws such as 16. Positioned adjacent the free end of the boot tube 8 is a bellmouth member 6. A thick-walled flexible plastic tube 10 is bonded into the end of the tube 8 by means, for example of epoxy resin when using a polyethylene tube 10. Over the tube 8 and shank of the bellmouth member 6 is positioned a split rubber or polyurethane molding 20, and over the free end of the tube 10 is positioned a split rubber or polyurethane molding 22. A molded protective and flexible gaiter 59 of, for example, rubber or polyurethane, connects the bellmouth member to the split molding 22. The split moldings 20 and 22 and the gaiter are held in place by stainless steel or other forms of strapping 60 which are secured with buckles (not shown).

The free end of the cable 1 is then prepared as follows. The outer sheath 15 is split and removed from the end portion of the cable. The outer conductor 14 is removed from a part of this end portion such that there remains a piece of outer conductor 14 extending from under the remaining outer sheath 15. At the free end of the cable 1 a portion of the dielectric 13 is removed in order to bare the inner conductor 12, and a portion of the inner conductor 12 is removed in order to bare the stranded rope 11. The dielectric 13 is shaped at the free end of the cable, as indicated in the drawing, and the end thereof may be "roughened" in order to ensure a good connection between it and dielectric subsequently molded around an anchor assembly, as will be described hereinafter.

Slits 14a cut in the free end of the outer conductor 14. The slits are parallel and equispaced, thereby forming a number of strips which may be lifted away from the dielectric 13. Each strip is in turn lifted from the dielectric, a respective processed aluminum strip 29, of, for example, ALSTAN ®, spot welded to it at two places, and then the strips reformed into their original position.

A composite water barrier and tube assembly is formed and positioned on the free end of cable 1 as follows. A grooved and castellated barrier tube 32, which has a liner 33, and a skirt anode 30 is formed and slid over the prepared cable end to adopt the position shown in the drawing, with the barrier tube skirt 28 butting the end of the outer conductor 14 under the strips 29 as shown. If the outer conductor 14 is of aluminum, the barrier tube 32 may be of brass, the liner 33 of beryllium copper, and the skirt 28 of copper. The ends of the strips 29 adjacent the copper skirt 28 are copper plated and the surface in contact with the skirt 28 is tinned. The strips 29 may then be spot soldered to the skirt 28 to provide electrical continuity between the copper skirt 28 and the aluminum outer conductor 14. The jointed strip area between the castellation 35 and the end of the cable sheath may be wrapped with protective tape 52. A split packing tube 31 is positioned over the wrapped area as shown.

An anchor assembly is formed from an anchor ferrule 17, having a bore 18 extending into one end thereof, and a nose portion 19 and an anchor ceramic 21, manufactured from a highly aluminum content ceramic. The anchor ceramic 21 is slipped over the ferrule 17 and bonded thereto in the position shown. One end of a length of stranded conductor from core 24 is brazed into a bore 27 of the nose portion 19. A molding of dielectric 36 is made extending over the length of the stranded core 24, and over the anchor assembly. The end of the inner conductor 12 and the stranded steel rope 11 are positioned in the anchor ferrule bore 18, the end of the rope having previously been splayed out and reformed such that it will enter bore 18. The end portion of the ferrule 17 containing the rope 11 is then pressed onto the rope 11 to insure good mechanical contact therebetween and good electrical contact with the inner conductor 12.

A polyethylene dielectric molding is made extending from the anchor molding 36 to the oversheath tube 4 encapsulating castellation 38, portion 36a and around the barrier tube assembly, portion 37. The castellation 38 of the barrier tube 32 is provided with axially directed grooves 38a which insure that the molded dielectric is continuous between portions 36a and 37. The oversheath tube 4 is positioned as shown, and sealed to the outer sheath 15 by means of a dielectric molding 26.

The copper spinning 39 and windowed braid 39a are pulled up into position over dielectric moldings 36 and 36a as shown. The anchor housing 3 is pulled up into position over the spinning 39. A copper braid spinning 25, forming an outer conductor for a termination braid assembly or tail cable 23, the stranded conductor 24 forming the inner conductor thereof, is pulled up over the left-hand end of the dielectric molding 36. The termination braid assembly is provided with a coupling 40 enabling it to be connected to a tail cable (not shown) extending from a repeater. An anchor housing end cap 47 is slipped over the braid assembly 23 and secured to the anchor housing by screws such as 48, the spinnings 25 and 39 being clamped therebetween and in good electrical contact with one another. The end cap 47 is keyed to the dielectric molding portion 36 by means of anti-rotation pins such as 49 positioned in bores drilled for the purpose. A pin retaining plate 49a is screwed to the end cap 47.

Copper tabs (not shown), which are brazed to the right-hand end of the castellation 38, are folded down over the copper tube lining windowed braid 39a and brazed thereto. The heat shrinkable tube 5 is pulled up and shrunk into place over the oversheath tube 4 etc. One or two layers of spun yarn 53 are applied over the outer sheath 15. A layer of a protective material such as TELECOMPOUND 56 is applied over the exposed windowed braid 39a and copper tabs 43. Two layers of protective tape, 54 and 55, are applied over the material 56 up the heat shrinkable tube 5. A protective tape 57 is applied over the tape 55 and the spun yarn 53, followed by a layer of duck tape 58. The tail cable 23 is also covered by protective material and tapes (not shown).

The boot assembly 2 is pulled up to the anchor housing 3 and attached thereto by screws such as 33a. Anchor housing 3 and boot assembly 2 are attached to the repeater housing extension tube 50 having a threaded portion 50a by means of screws such as 51. In order to connect the termination to a repeater, the tail cable 23 is first connected to the repeater tail cable.

As can be ascertained from the above description, the right-hand end of the boot assembly is provided with a degree of flexibility by means of the flexible tube 10, the extent of movement being controlled by the bellmouth member 6. Hence the cable 1 can bend with the tube 10 during cable handling and recovery and the risk of damage to the termination can be minimized during such operations.

Briefly therefore there has been described a termination between a submarine coaxial cable and a submergible repeater housing in which the continuity of the inner conductor is maintained via an anchor ferrule member, the continuity of the outer conductor is maintained via a covering, over the anchor dielectric molding, and a water barrier tube assembly. The tension is transferred via an anchor ceramic and an anchor housing, the latter being fixed rigidly to the repeater housing. Flexure of the cable and a portion of the boot assembly is permitted to prevent damage to the termination during cable laying operations.

What is claimed is:

1. A termination for connecting a submarine coaxial cable to a submergible repeater housing comprising:
   an anchor assembly for rigidly clamping a central strength member of the cable to the housing;
   boot assembly means for surrounding and supporting the cable where it extends away from said anchor assembly;
   said boot assembly means being rigidly connectible to the housing and being constructed to allow the cable to flex to a greater extent within its free end than near its end connectible to the housing;
   said free end of said boot assembly means including a flexible tube through which the cable passes;
   the degree of flexure of said tube and cable being restricted by a bellmouth member surrounding a portion of said flexible tube and having its mouth opening toward said free end of said boot assembly means;
   a protective molding arranged on the end of said flexible tube at said free end of said boot assembly means; and
   a flexible protective gaiter connecting said molding and said bellmouth member.

2. A termination for connecting a submarine coaxial cable to a subergible repeater housing comprising:
   an anchor assembly for rigidly clamping a central strength member of the cable to the housing;
   boot assembly means for surrounding and supporting the cable where it extends away from said anchor assembly;
   said boot assembly means being rigidly connectible to the housing and being constructed to allow the cable to flex to a greater extent within its free end than near its end connectible to the housing; and
   said boot assembly means including a boot tube embodying a flange member at one end thereof, a bellmouth member arranged at the other end of said boot tube with its mouth opening in the direction away from said flange member, a flexible tube connected to the other end of said boot tube and extending in the direction away from said flange member through said bellmouth member, a first protective molding arranged on said boot tube, and a second protective molding arranged on said flexible tube, and a flexible gaiter connecting said bellmouth member and said second molding.

* * * * *